Sept. 1, 1964 R. E. MOTTIN ETAL 3,146,887
INSPECTION APPARATUS
Filed Aug. 9, 1961 6 Sheets-Sheet 1

INVENTORS
RALPH E. MOTTIN &
ROBERT D. McDONALD
BY
ATTORNEYS

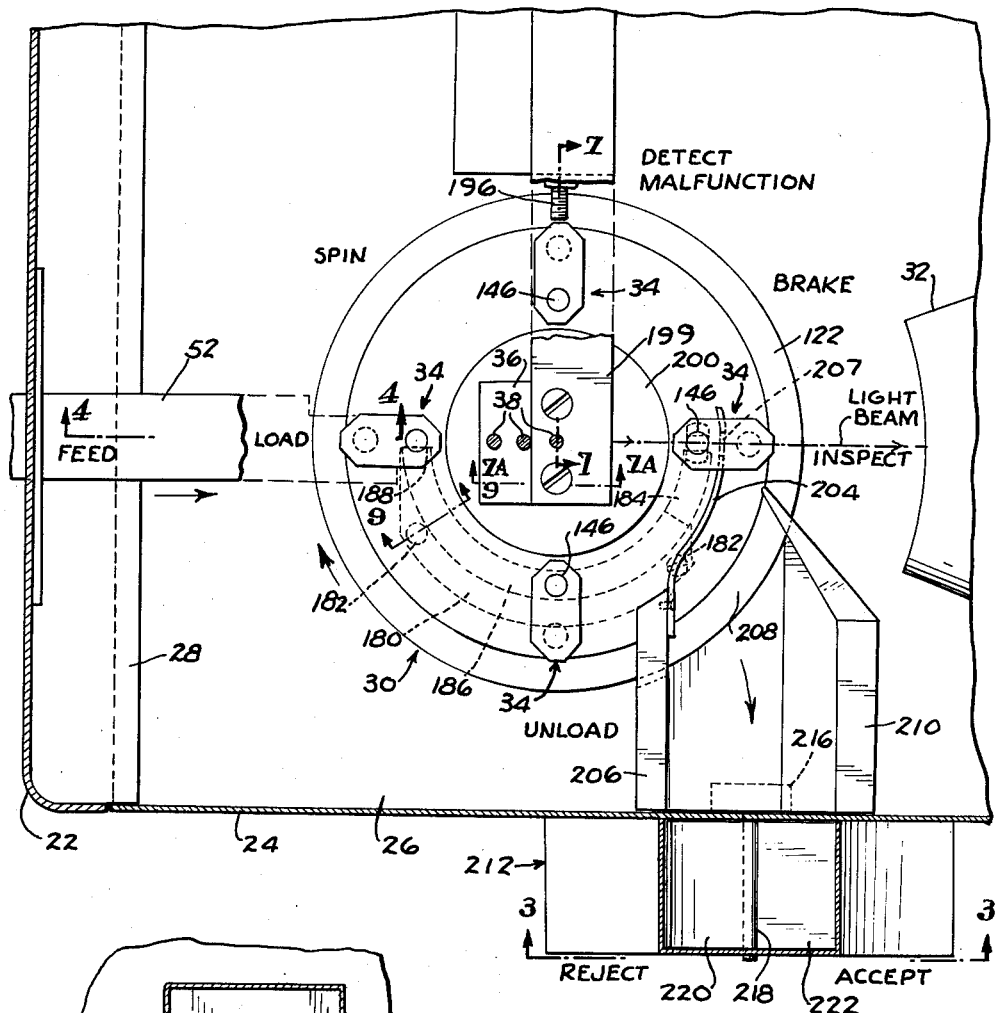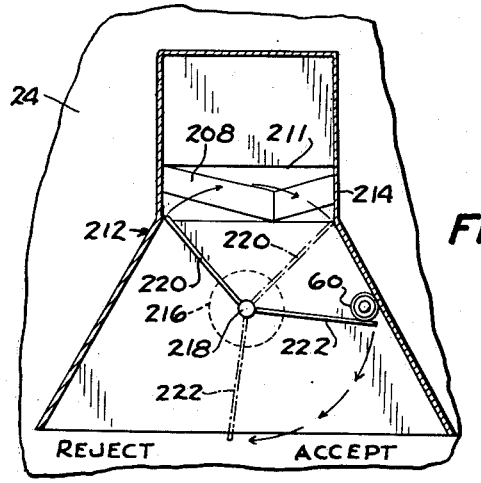

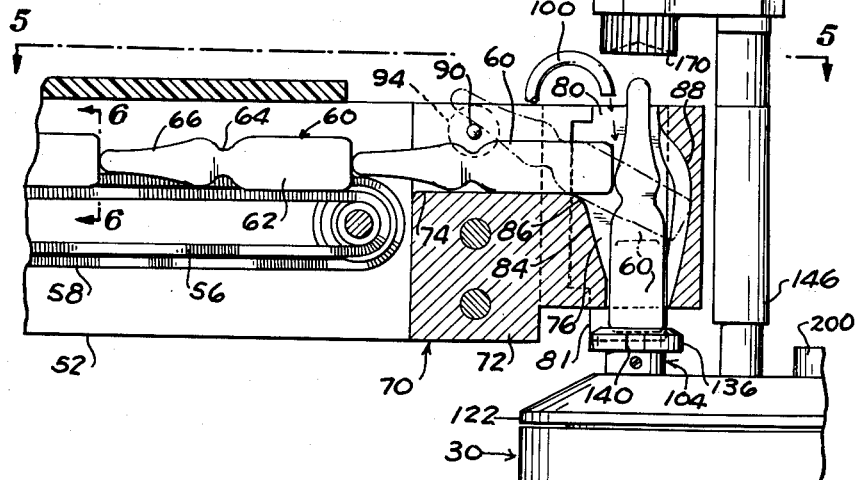
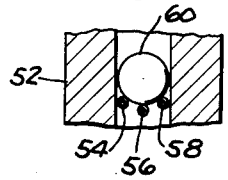
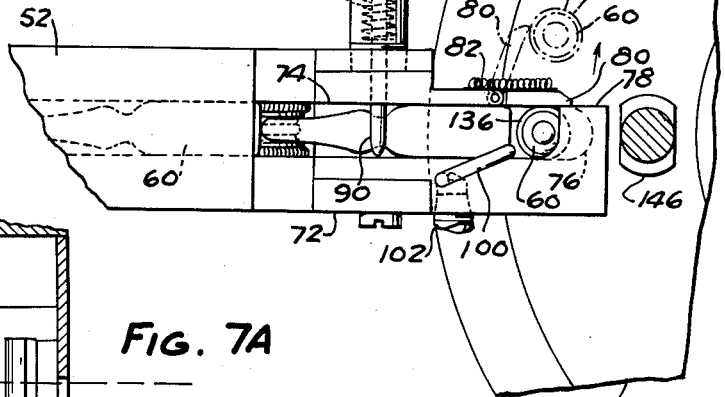
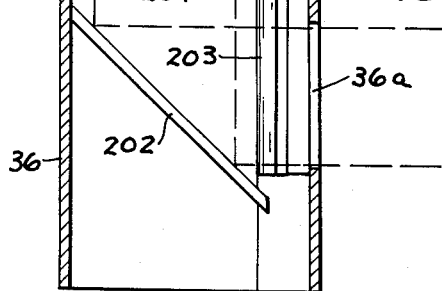

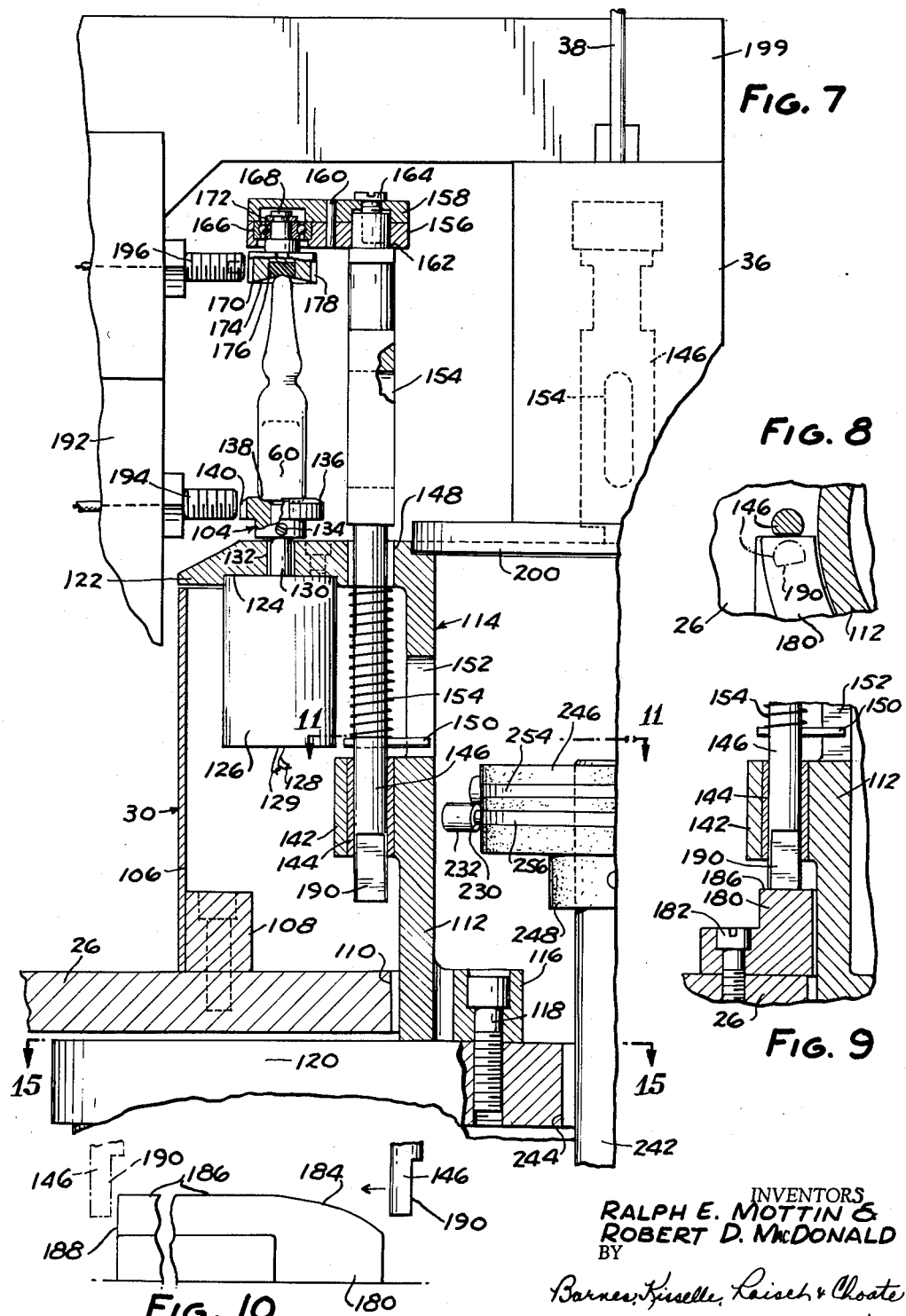

Sept. 1, 1964    R. E. MOTTIN ETAL    3,146,887
INSPECTION APPARATUS
Filed Aug. 9, 1961    6 Sheets-Sheet 5
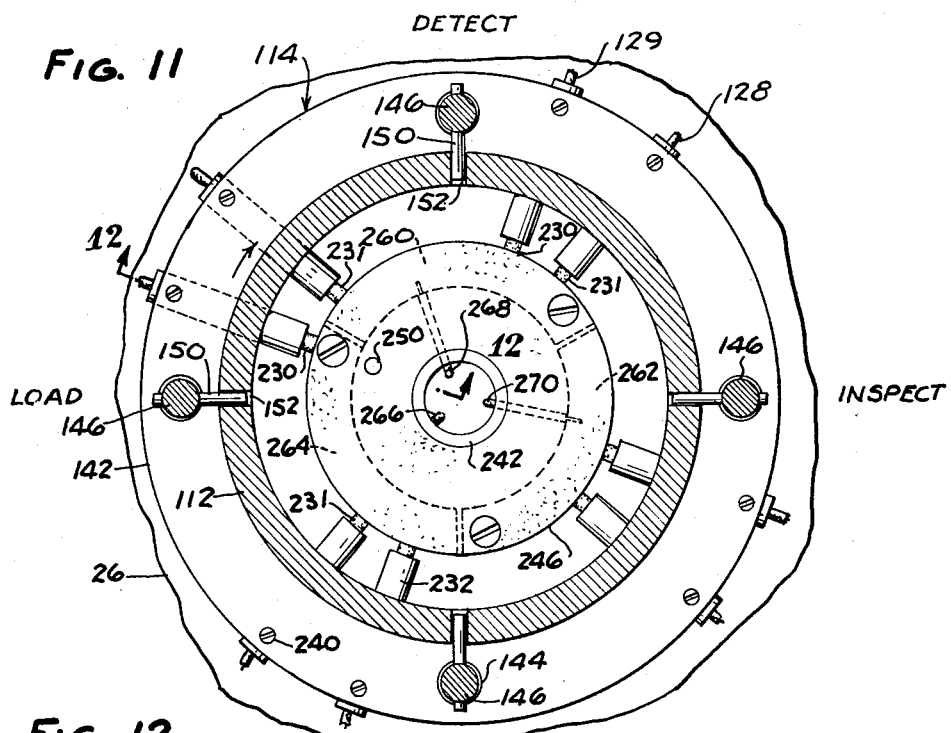
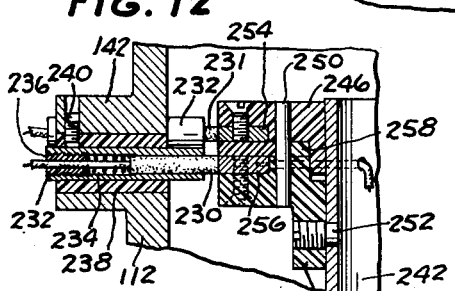
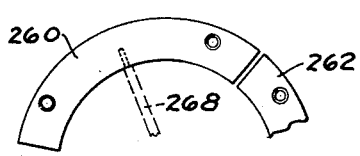
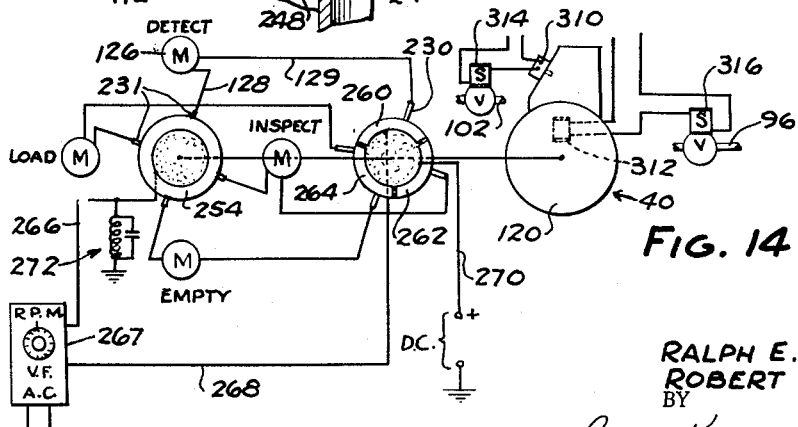
INVENTORS
RALPH E. MOTTIN &
ROBERT D. McDONALD
BY
Barnes, Kisselle, Raisch & Choate
ATTORNEYS Sept. 1, 1964  R. E. MOTTIN ETAL  3,146,887
INSPECTION APPARATUS
Filed Aug. 9, 1961  6 Sheets-Sheet 6

INVENTORS
RALPH E. MOTTIN &
ROBERT D. MacDONALD
BY
Barnes, Kisselle, Raisch & Choate
ATTORNEYS

United States Patent Office 3,146,887
Patented Sept. 1, 1964

3,146,887
INSPECTION APPARATUS
Ralph E. Mottin, Taylor, and Robert D. MacDonald, Tecumseh, Mich., assignors to Parke, Davis & Company, Detroit, Mich., a corporation of Michigan
Filed Aug. 9, 1961, Ser. No. 130,426
29 Claims. (Cl. 209—73)

This invention relates to improved apparatus for inspecting the contents of light transmitting liquid-filled containers, such as medical ampoules, for the presence of foreign or unwanted particles.

Liquid medicaments and other liquids intended for therapeutic use are frequently packaged in small, hermetically sealed, substantially cylindrical containers made of glass or other transparent materials and commonly known as "ampoules." The contents of the ampoules must have a high degree of purity and be substantially free of any foreign particles. Ampoules which contain foreign matter must be discarded and therefore it is necessary to very carefully inspect the ampoules prior to packaging in order to detect and remove those ampoules containing such foreign substances.

It is therefore an object of the present invention to provide an improved apparatus for electronically inspecting the contents of individual liquid-filled containers, particularly those of relatively small size.

Another object is to provide an improved apparatus which imparts a whirling motion to the contents of a liquid-filled ampoule and which inspects the whirling contents photo-electrically by passing a beam of light through the ampoule.

A further object is to provide an improved apparatus for inspecting the fluid contents of a light-passing liquid-filled container for the presence of particles having specific gravities greater than, equal to or less than that of liquid in the container.

Still another object of the invention is to provide apparatus of the above character having an improved mechanism for rapidly and reliably loading ampoules into the rotating chucks therefor.

A still further object is to provide an apparatus of the above character having a multiple station rotary transport mechanism for spinning, decelerating and simultaneously transporting ampoules prior to registration with the inspecting light beam.

A further object is to provide an improved apparatus of the above character in which the spin speed of the ampoules is precisely controllable over a relatively wide range and in which the initiation and termination of the ampoule spinning motion during transport of the ampoules is easily adjustable relative to the fixed path of the inspection beam.

Yet another object is to provide an improved apparatus for inspecting the liquid contents of ampoules which is capable of rapid and efficient operation, simplified in construction and relatively easy to clean and maintain.

In the accompanying drawings:

FIG. 2 is an enlarged fragmentary sectional view taken on the line 2—2 of FIG. 1 and illustrating an ampoule chucking turret.

FIG. 3 is a sectional view taken on the line 3—3 of FIG. 2, illustrating the accept-reject outfeed gate.

FIG. 4 is an enlarged sectional view taken on the line 4—4 of FIG. 2 illustrating a chuck loading mechanism of the invention.

FIG. 5 is a sectional view taken on the line 5—5 of FIG. 4.

FIG. 6 is a sectional view taken on the line 6—6 of FIG. 4.

FIG. 7 is an enlarged sectional view taken on the line 7—7 of FIG. 2 illustrating details of the ampoule chuck structure.

FIG. 7A is an enlarged sectional view taken on the line 7A—7A of FIG. 2 illustrating details of an optical head.

FIG. 8 is a fragmentary plan view of the drop-off end of the chuck cam.

FIG. 9 is a sectional view taken on the line 9—9 of FIG. 2.

FIG. 10 is a fragmentary elevational view showing the rise and drop-off contour of the chuck cam.

FIG. 11 is a sectional view taken on the line 11—11 of FIG. 7 illustrating the slip ring and brush structure of the turret for controlling the spin motors.

FIG. 12 is a fragmentary sectional view taken on the line 12—12 of FIG. 11.

FIG. 13 is a fragmentary elevational view of segments of the slip ring structure of FIGS. 11 and 12.

FIG. 14 is a simplified schematic diagram of the control circuits for the spin motors and chuck loading mechanism.

Figure 1:
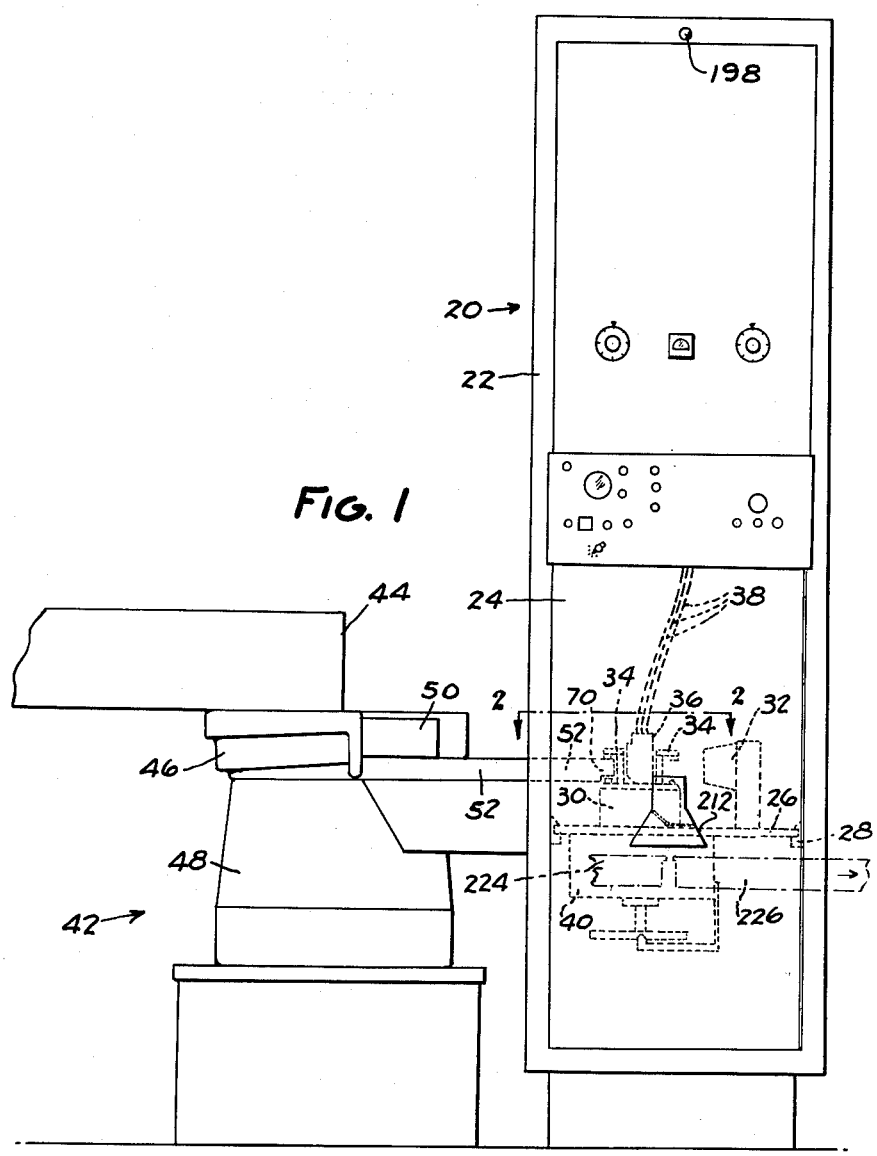
FIG. 1 is an elevational view of an ampoule inspection machine constructed in accordance with the present invention.

Inspection apparatus and methods are known in the bottling art for handling and inspecting relatively large containers such as soda pop bottles which have considerable structural strength. Patent No. 2,132,447 of George Philip Stout describes one such method and apparatus for inspecting the liquid contents of a bottle. The Stout method is similar to that performed by the improved apparatus of the present invention and includes the steps of holding the bottles between rotatable chucks, rapidly spinning the bottle via rotation of the chucks until the contents are also rotating with the bottle, suddenly stopping the rotation of the bottle and, immediately thereafter, photo-electrically inspecting the contents of the bottle while the liquid is still rotating but while the bottle is stationary. A beam of light is focused through the bottle in a plane parallel to the axis of rotation thereof and a portion of the light passing through the bottle impinges on photoelectric cells on the other side of the bottle. Any particle of contaminating matter suspended in the liquid moves rapidly back and forth through the light beam due to the whirling motion of the liquid, thereby causing a signal to be produced in the output circuit of the photocell. The characteristics of the bottle itself do not influence the results of the inspection since the bottle is stationary during the inspection.

However, as far as is known there has been no satisfactory apparatus prior to the present invention for performing the above method which is capable of successfully handling relatively small objects such as medical ampoules. Such ampoules generally range in size from a volume of 10 cc. down to ½ cc. and correspondingly range in length and diameter from 3″ x ¾″ down to 1″ x ¼″. In addition, medical ampoules are usually quite fragile with relatively thin walls.

In general, the improved apparatus of the present invention comprises a multiple-chuck rotary turret wherein each chuck successively receives an ampoule at a first station, and during the index to the second station successively clamps and rotates the ampoule so that it is spinning at full speed when the chuck reaches the second station. Malfunction detectors at the second station determine whether or not an ampoule is properly chucked as well as spinning correctly. During the index to the third station rotation of the ampoule is decelerated so that the ampoule is stationary as if is brought into registration with an inspecting light beam directed through the ampoule at the third station. The rotating liquid contents of the ampoule are inspected for the presence of foreign particles during the pause of the chuck at the third station and if a bad ampoule is detected a discharge gate is set to segregate the bad ampoule from the good ampoule output. During the index of the chuck from the third inspection station to the fourth station the chuck opens just before the ampoule runs into a stripper plate which removes the ampoule from the chuck as the chuck passes under the plate, the ampoule then falling down a discharge chute and into the gate where it is directed to the proper output.

Other important features of the invention include a chuck loading mechanism wherein ampoules are fed bottom end first with their longitudinal axis horizontal to the first station where they are tipped upright and placed on the lower chuck. The upper chuck is adapted to catch and reliably clamp the ampoule after the turret starts to index without injuring the fragile ampoule. Another feature is the provision of a separate electric motor drive for each chuck whereby a simplified, low mass chucking structure is obtained the spin speed of which is readily controllable within close limits. A further feature is the provision of a control system mounted stationarily in the center of the turret utilizing brush contacts for adjustably controlling the energization and de-energization of the motors during their movement with the revolving turret. In addition, the handling, inspecting and driving mechanisms are so arranged to provide an easily accessible and generally open operating area which is easily cleaned in the event of ampoule breakage.

General Arrangement of Ampoule Inspection Machine

Referring to FIG. 1, the ampoule inspection machine 20 of the present invention is enclosed entirely within an upright cabinet 22 the upper half of which contains electrical apparatus and circuitry associated with the inspection apparatus which may be of conventional design and therefore not disclosed in detail herein. The lower half of cabinet 22 comprises a machinery compartment accessible through door 24. The lower compartment contains the apparatus of the present invention including a platform 26 slidably mounted on supports 28 which permits the platform to be drawn out in front of the machine when door 24 is open to facilitate servicing and cleaning of the inspection apparatus. Mounted on platform 26 is a turret structure 30 and a photocell apparatus 32 referred to subsequently in more detail. Turret structure 30 includes four ampoule chucking structures 34 which rotate around a central stationary optical head 36 which is connected to a light source in the upper portion of cabinet 22 via three fiber optic light pipe 38. An indexing mechanism 40 is suspended from and below platform 36 for driving turret structure 30.

Ampoule Infeed Mechanism

Ampoules are supplied to the inspection machine by an automatic feeder mechanism 42 which may be either of conventional construction or a feeder mechanism such as shown and described in co-pending patent application Ser. No. 853,354 of Ralph E. Mottin, filed November 16, 1959, now Patent No. 3,106,281, and entitled Automatic Feeder Mechanism for Orienting Relatively Small Articles. Briefly, the said Mottin feeder mechanism includes a supply hopper 44 mounted above a vibratory feeder bowl 46 driven by a known type of vibrating mechanism 48. Ampoules in hopper 44 are fed from the hopper into bowl 46 which operates in a known manner to continuously advance a single row of ampoules having a mixture of oriented and non-oriented ampoules to an automatic orienting mechanism 50 which functions to align the ampoules in the proper end-to-end sequence and feed them bottom end first to a conveyor 52.

Conveyor 52 extends horizontally from the feeder mechanism 42 through the side wall of cabinet 22 and terminates in an ampoule chuck loading mechanism 70 (FIG. 4) described in detail later. Referring to FIGS. 4 and 6, conveyor 52 includes three endless belts 54, 56, and 58 trained around pulleys for driving and supporting the same. The conveyor belts may either be rubber O-rings or endless coil springs mounted so that the center belt 56 runs slightly below the outer belts 54, 58 to provide an endless conveyor which is effective to feed the ampoules bottom end first in single file succession so that they do not lock or wedge themselves together.

The ampoules 60 under consideration are shown approximately full size in FIGS. 4, 5 and 6 in conjunction with the structure of the ampoule chuck loading mechanism 70. Ampoules 60 are about 2 in. in length for a 1 cc. capacity and have a cylindrical container portion 62, a constricted break-off neck 64 and a tapering stem or spear 66 which is customarily sealed at the upper end thereof by a known flame fusing method subsequent to filling the ampoules with medicinal liquids. The center of gravity of the ampoule 60 is located closer to the bottom than to the top of the ampoule when it is standing upright. However, when the ampoule is horizontal the liquid contents tend to remain in the narrower spear 66 so that the location of the center of gravity for the horizontal position varies to a considerable extent between different sizes of ampoules and also within any given run of the same size ampoules.

Chuck Loading Mechanism

Chuck loading mechanism 70 (FIGS. 4 and 5) is specifically adapted to handle such ampoules and comprises a block 72 which is mounted at the discharge end of conveyor 52. A groove 74 formed in the upper side of block 72 has a width slightly greater than the outside diameter of ampoule cylindrical portion 62 and a depth such that the bottom surface of groove 74 forms a horizontal extension of middle belt 56 of conveyor 52. Ampoules are slidably received bottom end first in groove 74 and are advanced therein by the succeeding ampoule or ampoules which are being urged towards the block 72 by the sliding frictional engagement with belts 54, 56, 58. Groove 74 opens into a vertical cavity 76 formed in the outer end of block 72. Vertical cavity 76 is open at the top and bottom of the block as well as along the backside 78 of the block. A door 80 is hinged to the backside 78 of the block and is urged by a compression spring 82 to the position shown in solid lines in FIG. 5 wherein the door closes the backside opening of vertical cavity 76. The lower portion 81 of the door 80 extends below the undersurface of block 72 into the path of travel of a lower chuck 104, to be subsequently described. The surface 84 of cavity 76 closest to conveyor 52 is inclined upwardly into a rounded junction with the bottom surface of groove 74 to provide a transverse ledge 86 for smoothly guiding the ampoules from their horizontal position in groove 74 to an upright position in cavity 76. The surface 88 of cavity 76 opposite surface 84 is shaped to form a concave recess which deflects the bottom end of the ampoule downwardly and accommodates the tip-up re-orientation movement of the ampoule.

An ampoule resting in groove 74 is positively maintained in the horizontal position by a holddown plunger 90 slidably mounted for reciprocation through a bore in the backside of block 72. The forward end of plunger 90 is positioned to slidably extend across groove 74 a sufficient distance from the bottom of the groove to permit passage thereunder of the largest diameter ampoule to be inspected. The other end of plunger 90 comprises a piston 92 slidably received in the bore of an air cylinder 94. An air line 96 is connected to the outer end of air cylinder 94, and compressed air under control of a solenoid-actuated valve mechanism 316 (shown only schematically in FIG. 14) is admitted via line 96 to cylinder 94 to drive plunger 90 across groove 74. Plunger 90 is synchronized with the operation of the inspection machine in a manner to be described later. The valve mechanism also vents cylinder 94 so that the compression spring 98 may operate to retract plunger 90 from groove 74, thereby allowing the spear end of the ampoule to tip-up as the ampoule is driven into cavity 76 by the succeeding ampoule as indicated by broken lines in FIG. 4.

An air tube 100 is mounted in the upper side of block 72 and communicates internally of the block with another air line 102 also controlled by a solenoid-actuated valve mechanism 314 (FIG. 14) and adapted to supply compressed air to tube 100 in timed relation with the operation of plunger 90. The open outer end of tube 100 is positioned above the path of the ampoule advancing horizontally into cavity 76 and is aimed to direct a blast of air downwardly at ampoule cylindrical portion 62 after the same has traveled beyond the ledge 86. The blast of air tips the ampoule upright about the pivot point provided by ledge 86, such tip-up action also being aided by the ampoule becoming unbalanced as it enters the cavity 76. As the ampoule is tipped upright in cavity 76 the bottom of the ampoule is driven downwardly and is accurately guided by the bottom opening of cavity 76 into a lower chuck 104 of the chucking structure 34. The succeeding ampoule is advanced by the ampoule successive to it until its bottom end strikes the upright ampoule, thereby insuring that the upright ampoule is vertical prior to exit thereof from the backside opening of cavity 76. The upright ampoule in turn serves to hold back the horizontally advancing ampoules.

*Ampoule Chucking Mechanism*

Referring to FIG. 2, the ampoule chucking mechanism includes the cylindrical turret structure 30 with four identical chucking structures 34 mounted at 90° intervals therearound, each adapted to receive and support an ampule in upright position. As shown in more detail in FIG. 7 the turret structure 30 includes a cylindrical casing 106 affixed to an annular mounting ring 108 which is bolted to the upper surface of platform 26. An annular opening 110 in platform 26 is adapted to receive therethrough a cylindrical upright wall 112 of a turret 114. An annular, integral flange 116 extends inwardly from the bottom of turret wall 112 and is suitably drilled to receive mounting bolts 118 for fastening turret 114 to the upper surface of an intermittently rotated index table 120 operably associated with the indexing mechanism 40. Turret 114 has a circumferential horizontal flange 122 extending radially outward from the upper end of wall 112 and terminating in overlapping relation with the outer casing 106. Flange 122 is provided with four circular recesses 124 on the underside thereof each adapted to receive the upper end of an electric motor 126 which is bolted to flange 122. Motors 126 are preferably sub-miniature hysteresis type, two pole 115 volt 60 cycle alternating current motors, such as the Morton Type SC motors manufactured by Globe Industries of Dayton, Ohio. Motors 126 are separately energized via leads 128, 129 in a manner to be subsequently described. The armature-drive shaft 130 of motor 126 extends through a hole 132 in flange 122, and the lower chuck 104 is provided with a counter bore which receives shaft 130 so as to support chuck 104 slightly above the upper surface of flange 122. Chuck 104 is fastened to shaft 130 by a set screw 134 so that the chuck is directly driven by motor 126. Chuck 104 is cylindrical and has a platform flange 136 with a recess 138 formed in the upper surface thereof to accurately receive the bottom end of ampoule 60. The sides of recess 138 are generally conically shaped to assist in centering the ampoule in the recess. At least one notch 140 is formed in the outer periphery of platform flange 136 to provide a circumferentially discontinuous periphery for purposes of malfunction detection explained subsequently.

Each of the ampoule chucking structures 34 also includes an upper chuck structure which is supported by turret 114. An annular flange 142 integral with turret wall 112 extends radially outward therefrom and is provided with four vertical bushings 144 each of which slidably supports a cylindrical chuck stem 146 in radial alignment with motor shaft 130. Stem 146 extends upwardly through a co-axial hole 148 drilled through turret flange 122 and terminates beyond the upper end of the ampoule seated in adjacent chuck 104. A guide pin 150 extends radially through the portion of stem 146 immediately above turret flange 142, one end of pin 150 extending into a vertical slot 152 formed in turret wall 112 adjacent to the stem 146 (FIGS. 7 and 11). A compression spring 154 encircles stem 146 and bottoms against the underside of flange 122 and pin 150 at its upper and lower end respectively and serves to urge stem 146 downwardly. A portion of stem 146 immediately above the turret flange 122 is transversely slotted to provide a radial opening 154 therethrough adapted to permit passage of an inspection light beam when the stem is indexed into the inspection station.

The upper end of stem 146 supports a pair of plates 156 and 158 which are joined together by a dowel 160. Plate 156 is bored to fit on the reduced upper end of stem 146, the underside of plate 156 resting on a shoulder 162 of the stem. The upper plate 158 has a counter bore which also receives the reduced upper end of stem 146. A cap screw 164 extending through plate 158 is threadably received in the upper end of stem 146 to clamp the plates together and to secure them on the shaft. Plates 156, 158 extend radially outward from the upper end of stem 146 and support a ball bearing assembly 166 above chuck 104 and in axial alignment with the axis of rotation thereof. A spindle 168 of an upper chuck 170 is journalled in ball bearing assembly 166, the upper end of spindle 168 being grooved to receive a retaining ring 172. The undersurface 174 of chuck 170 is conically recessed, preferably with an included angle of 120°, and the center of chuck 170 is countersunk to receive a resilient rubber insert 176 having a conical undersurface which is flush with surface 174 in the relaxed condition of the insert. Insert 176 is bonded solely at its upper surface to chuck 170. The outer periphery of upper chuck 170 is provided with a series of vertical grooves 178 to provide a serrated circumference.

The ampoule chucking structures 34 are opened and closed by a cam 180 shown in broken lines in FIG. 2 and in detail in the fragmentary views of FIGS. 8, 9 and 10. Cam 180 is a solid block of metal generally semicircular is shape which is fastened by bolts 182 to the upper surface of stationary platform 26 adjacent turret wall 112. The upper surface 184 at the leading end of cam 180 is inclined upwardly from the forward end of the cam and merges smoothly into a horizontal top surface 186 which terminates at the trailing end of the cam at a vertical dropoff surface 188. The bottom end of stem 146 is polished for sliding contact on the upper surfaces 184, 186 of cam 180. The trailing side of stem 146 is ground flat to provide a vertical surface 190 (FIG. 10) to permit stem 146 to drop rapidly off cam 180 without excessive wear on the stem or cam.

Cam 180 is positioned with its leading end 184 immediately following the inspection station and with the trailing end 188 at the loading station (FIG. 2). Stem 146 is thus raised to open the chuck structure as it rotates out of the inspection station until the upper chuck 170 is positioned above the lower chuck 104 as illustrated in FIG. 4 where it remains as the chuck structure rotates into the loading station. After an ampoule has been placed in position on lower chuck 104 by the chuck loading mechanism 70 turret 114 starts to index, thereby allowing stem 146 to rapidly drop off the trailing end of cam 180 due to the force of gravity and of the pressure of spring 154.

As shown in FIGS. 4 and 5, as the turret starts to index it also brings platform flange 136 of lower chuck 104 against the bottom extension 81 of door 80 so that the door is swung open to permit lower chuck 104 to carry the ampoule laterally out of vertical cavity 76 of loading block 72. It is to be noted that during the initial movement of the ampoule out of cavity 76 the upper end of the ampoule is unsupported and, due to the inertia of the ampoule, it tends to fall backwards into the cavity. The descent of upper chuck 170 is therefore so timed with the initial movement of the ampoule that the flaring surface 174 of the upper chuck catches the upper end of the backwardly tipping ampoule before the upper end of the ampoule can fall beyond the outer limits of the chuck. The conical shape of surface 174 serves to cam the outer end of the ampoule back into the center of undersurface 174 as the chuck is descending. When the upper end of the ampoule reaches the center of the chuck it is resiliently engaged by rubber insert 176 which thus serves as a shock absorber to cushion the impact of the upper chuck structure on the ampoule in the foregoing closing and clamping action. The rubber insert 176 also permits ampoules of varying length to be securely and reliably chucked, thereby accommodating tolerance variations common to a run of ampoules.

Immediately after the turret 114 has begun indexing the chuck structure out of the loading station, and after the ampoule is securely clamped between the upper and lower chucks 170, 104, motor 126 is energized and begins to accelerate from zero up to a predetermined maximum spin speed of, for example, 4000 r.p.m. Since the ampoule is driven directly by motor 126 through the frictional contact of chuck 104 therewith, the ampoule will spin at the same speed as the motor. The ampoule in turn drives upper chuck 170 through the frictional contact of the upper end of the ampoule with the rubber insert 176. Hence chuck 170 rotates at substantially the same speed as lower chuck 104. By the time the turret has indexed the chuck structure into the second station the ampoule has been accelerated to full spin speed.

Malfunction Detection

Referring to FIGS. 2 and 7, it will be seen that located adjacent the second or "detect malfunction" station is a support structure 192 having a pair of conventional magnetic pickup devices 194 and 196 mounted therein which terminate respectively adjacent the peripheries of lower chuck platform flange 136 and upper chuck 170. Due to the circumferential discontinuities in the respective chucks and the rotation thereof, the air gap distances between the ends of the respective pickup devices and the adjacent peripheral portion of the chucks varies at a frequency determined by the r.p.m. of the chucks multiplied by the number of notches 140 and 178 in the respective lower and upper chucks. If the motor and power control circuits are not functioning properly, or if lower chuck 104 is slipping on drive shaft 130, then such malfunctions will be reflected in the r.p.m. of the chuck and hence in an off-frequency output signal from pickup 194. This off-frequency signal is translated by conventional circuitry (not shown) into a malfunction actuating signal which via suitable relays is caused to shut down the inspection machine, sound a buzzer and energize a light 198 located at the top of cabinet 22.

Since upper chuck 170 is driven from the lower chuck through the ampoule itself, the upper magnetic pickup 196 will detect not only the presence of a malfunction in the upper chuck 170 but will also indicate whether or not an ampoule is located between the chucks, and if so, whether or not it is securely clamped by the chuck. Thus, if the ampoule has broken or fallen out of the chuck or is only loosely clamped therein, a malfunction signal is generated which is transmitted to conventional circuitry (not shown) which is set to receive five consecutive malfunction indicating signals from upper pickup 196 before generating an output signal operable to shut down the machine, sound the buzzer and energize light 193. The five signal count prevents machine shutdown during normal startup and finish of a run of ampoules through the chucks, at which time up to four chucks may rotate empty through the malfunction detection station before they are all loaded or unloaded.

Inspection Apparatus

Referring to FIGS. 1, 2, 7 and 7A, after the ampoule chucks have been checked at the detection station to insure that the ampoule has been brought up to full spin speed, turret 114 indexes and advances the chuck towards the inspection station. During the 90° traverse of the chuck structure between the detection and inspection stations the ampoule is decelerated by applying direct current to the field windings of motor 126, thereby generating a fixed field which resists rotation of the motor armature. By the time the chuck structure has reached the inspection station the chucks and the ampoule have ceased spinning, but the fluid contents of the ampoule still continue to rotate with a gradually diminishing velocity. The vortex which is caused to form in the fluid contents of the ampoules during the acceleration of the contents thereof gradually diminishes and becomes shorter in accordance with the diminishing speed of rotation of the fluid. The spin and braking intervals are so correlated with the index motion of the turret that when the ampoule is brought to rest at the inspection station, the rotational speed of the fluid therein has decreased to a point where the turbulence of the liquid content has substantially subsided and the vortex of the spinning liquid has diminished or risen to a point slightly below its non-rotating position. Immediately upon entry of the ampoule into the inspection station, the inspection circuitry is automatically conditioned or set so that a beam of light passing through the ampoule enables the photocells to determine the presence of any foreign objects rotating through the beam.

It is to be understood that the present invention does not encompass that portion of the inspection method and apparatus relating to the photocell apparatus 36 and the circuitry associated therewith. Such apparatus and circuitry may be any suitable arrangement, although it is preferred to employ the double lenses and photocell pick-up systems described in Patent No. 2,531,529 of James F. Price to which reference may be made for further details.

Referring to FIGS. 7 and 7A, light is conducted from a suitable remote light source mounted in the upper portion of cabinet 22 via the three fiber optic light pipes 38, the output ends of which are mounted vertically in the top of the housing of optical head 36. Light pipes 38 are of sufficient length to permit platform 26 to be slid out in front of cabinet 22 to the servicing position without having to disconnect the light pipes. The optical head 36 is hung from the outer end of a supporting arm 199 which extends from the vertical support structure 192 radially of turret 114 to a point over the center of the turret 30. Optical head 36 in turn supports a circular, stationary cover plate 200 which serves to seal the open upper end of the cylindrical turret wall 112. The output ends of light pipes 38 are arranged in a row extending radially from the axial center of the turret structure 30 and are mounted so as to project three overlapping beams of light into three condensing lenses 201 which focus the light onto a mirror 202 mounted at a 45 degree angle in optical head 36 (FIG. 7A). Mirror 202 is positioned to reflect the beams of light horizontally to another condensing lens 203 mounted vertically in optical head 36 and then through a masking slot 36a provided in the side of the housing so that parallel light rays form a narrow beam approximately the height of the filled portion of the ampoule. A narrow rectangular reflecting area of the mirror is surrounded by a non-reflecting surface to further assist in defining a narrow beam of light. This beam of light emerging from optical head 36 passes through slotted portion 154 of chuck stem 146 and then through the ampoule and on across to photocell apparatus 32. The slot 154 thus also serves as a second mask to further define the beam of light prior to its passage through the ampoule.

*Ampoule Discharge Apparatus*

Referring to FIGS. 1 and 2, the apparatus for removing the ampoule from the chuck after it has been inspected includes a thin, opaque stripper plate 204 which is mounted at one end on a vertical wall 206 supported upright on the platform 26. The inner end of wall 206 terminates short of the circular path of travel of chuck stem 146, and stripper plate 204 is curved so as to project from wall 206 alongside and outwardly of the circular path of travel of the stem. The height of plate 204 is slightly less than that of the ampoule and the plate is positioned so that upper and lower chucks 170 and 104 can pass respectively over and under the plate as the chuck structure rotates out of the inspection station. The free end of plate 204 extends between chuck stem 146 and the ampoule chucks when the same are positioned at the inspection station, this portion of plate 204 being vertically slotted as at 207 (FIG. 2) to provide a third mask to still further define the light beam prior to passage thereof through the ampoule. Stripper plate 204 also serves to prevent spurious reflections of light from reaching photocell apparatus 32.

It is to be understood that the elevating surface 184 of cam 189 merges with the horizontal surface 186 thereof at a point oriented to open the chucks prior to the intersection of plate 204 and wall 206 with the path of travel of the ampoule. Upper chuck 170 is thus raised to the fully open position indicated in FIG. 4 when the ampoule engages stripper plate 204, the angle of engagement of the ampoule with plate 204 being initially almost tangential so that the ampoule is gradually cammed off the lower chuck as the same travels along stripper plate 204. Once clear of the lower chuck, the ampoule falls into a V-shaped chute 208 which is inclined downwardly between wall 206 and an opposite retaining wall 210. Chute 208 directs the ampoules through a suitable opening 211 in cabinet door 24 where the ampoule falls into a segregating gate 212 mounted on the outer side of the door.

Segregating gate 212 (FIG. 3) is a box-like structure with a housing 214 shaped similar to an inverted funnel, the upper part of housing 214 being mounted on the outer side of the cabinet door 24 in registry with the door opening 211. A rotary solenoid 216 is mounted on the inside of door 24 below door opening 211 so that the driven shaft 218 extends through door 24 and into the approximate center of the lower flaring portion of housing 214. A pair of vanes or paddles 220 and 222 are mounted on shaft 218 for rotation about the axis of the shaft. Paddle 220 is dimensioned so that its outer end rests against the left side of housing 214 at one extreme of the rotation of the paddle and against the right side of housing 214 at the other extreme of travel, the latter position being indicated in FIG. 3 by broken lines. Similarly, paddle 222 rotates between a position where the outer end thereof is adjacent the flaring side wall of the housing 214 to a generally vertical position corresponding to the dividing line between suitable reject and accept conveyors 224 and 226 provided for carrying the inspected ampoules away from the inspection machine 20 (FIG. 1).

The rotary solenoid 216 is preferably adjusted to maintain paddles 220, 222 in the broken line position thereof when solenoid 216 is de-energized so that all the ampoules are directed by paddle 220 into the reject conveyor except when the solenoid is energized. The inspection apparatus associated with photocell apparatus 32 is accordingly set up to generate an actuating signal for operating rotary solenoid 216 only when the inspecting light beam indicates that the ampoule undergoing inspection is a good ampoule with no contaminating foreign matter therein.

As soon as such a signal is generated paddles 220, 222 are rotated by solenoid 216 to the solid line positions thereof and are held in this position until shortly after the turret has completed the index. Good ampoules removed from the chucks are thus caught by paddles 220, 222 and are held on paddle 222 until the solenoid actuating signal terminates, whereupon rotary solenoid 216 returns paddle 222 to the vertical position, thereby dropping the ampoules onto the accept conveyor 226. The segregating gate thus serves to catch and cushion the descent of the good ampoules. Moreover, if a malfunction should occur in the solenoid circuit all the ampoules would be rejected rather than incurring the risk of mixing bad ampoules in a batch of good ampoules.

*Control Apparatus*

Referring to FIGS. 7 and 11–14, the turret 114 supports four pairs of lower and upper brushes 230 and 231, one pair for each motor, which rotate around a slip ring structure mounted centrally within the hollow interior of the turret. As shown in detail in FIG. 12, each brush assembly comprises a cylindrical carbon brush 230 or 231, a brass brush holder sleeve 232, a compression coil spring 234 for urging brush 230 radially inward of the turret, a retaining screw plug 236 and a nylon insulating bushing 238. Each brush assembly is mounted in a hole drilled radially through the annular flange 142 of turret 114 and is adjustably fastened in place by a set screw 240. The radial holes are arranged in vertically offset pairs so that each pair of brushes 230 and 231 is likewise vertically offset from one another. As best seen in FIG. 11, the lower brush 230 is mounted 20 degrees ahead of the corresponding chuck stem 146 while the upper brush 231 is mounted 40 degrees ahead of stem 146.

The slip ring structure is concentric with the turret structure and comprises a stationary hollow shaft 242 which extends vertically up through a center hole 244 provided in the intermittently rotated index table 120 (FIG. 7). The upper end of shaft 242 supports upper and lower slip ring hubs 246 and 248 respectively formed of electrically insulating material and which are keyed together by a pin 250 and fastened to the shaft by a fastener 252. Upper hub 246 is circumferentially recessed on the underside thereof to receive and support a one-piece circular slip ring 254 and the lower hub 248 is likewise recessed on its upper face to support a three-piece slip ring assembly 256. A circular one-piece insulating ring 258 is clamped between the adjacent surfaces of the hubs 246, 248 to insulate slip rings 254, 256 from one another. The one-piece slip ring 254 is positioned for sliding contact with upper brushes 231 while the three piece slip ring assembly 256 is slidably contacted by lower brushes 230. The three-piece slip ring assembly 256 consists of a motor energizing segment 260, a motor braking segment 262 and a motor de-energizing segment 264. These ring segments are angularly positioned relative to the four chucking stations of the turret as indicated in the broken line showing thereof in FIG. 11.

The circuitry associated with the slip rings is shown in simplified form in the schematic diagram of FIG. 14. As exemplified by motor 126, each motor is connected via leads 128 and 129 to an upper brush 231 and a lower brush 230. The upper, common slip ring 254 is connected by a lead 266 with one terminal of a variable frequency alternating current power source 267 of known design. The other terminal of the variable frequency power supply is connected via lead 268 to the motor energizing slip ring segment 260. The positive terminal of a direct current power source is connected via lead 270 to the motor braking slip ring segment 262. The D.C. circuit is completed via brush 230, lead 129, the motor field windings, brush 231, common slip ring 254, and a suitable A.C. blocking circuit 272 to ground. The third slip ring segment 264 is not connected in circuit and serves as a motor deenergizing or dead ring.

In operation of the motor control structure, starting with the chuck structure and motor 126 at the loading station, it will be seen that the corresponding lower brush 230 is in contact with dead segment 264 and therefore motor 126 is de-energized so that lower chuck 104 is stationary while the ampoule is being loaded into the lower chuck. As soon as the turret 114 starts to index the chuck out of the loading station and immediately after upper chuck 170 has descended onto the ampoule to clamp the same in the chucks, lower brush 230 is rotated into sliding contact with the motor energizing or spin segment 260, thereby connecting the motor with the variable frequency alternating current power supply and causing the motor to accelerate up to maximum spin speed. A wide range of closely controlled speeds are readily obtained by merely turning the control knob of the variable frequency power supply. Maximum speed is attained just prior to the chuck structure entering the malfunction detecting station wherein the turret pauses with brush 230 still in contact with energizing segment 260.

During the next index of the turret, brush 230 is rotated out of engagement with the energizing segment 260 and into engagement with the breaking segment 262, thereby successively disconnecting alternating current from the motor and connecting direct current to the field windings of the motor so that a braking force is applied to the armature to decelerate the motor and the chucks associated therewith. The amount of braking time may be set as desired by angularly adjusting shaft 242 to vary the circumferential length of segment 262 contacted by brush 230 prior to arrival at the inspection station. Preferably this is set to bring the ampoule to a standstill as it enters the inspection station. During the third index of the turret the brush 230 maintains contact with braking segment 262 to hold the lower chuck stationary as it passes under ampoule stripper plate 204. During the fourth index brush 230 is in contact with dead segment 264 so that motor 126 is de-energized during travel of the chucks through this portion of the index cycle.

Figure 15:
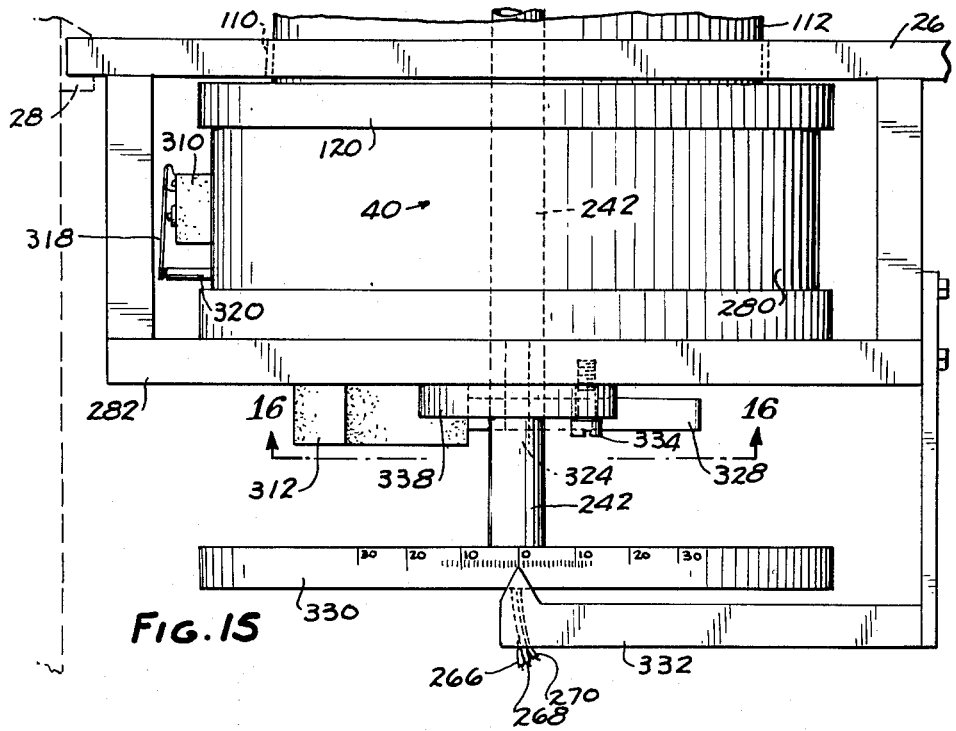
FIG. 15 is a fragmentary elevational view illustrating the mounting of the index drive mechanism and angular adjustment hand wheel for the turret structure.

The basic intermittent indexing motion of the turret 114 is supplied by a conventional indexing mechanism 40 illustrated in FIG. 15. One such index mechanism found suitable for use in the inspection machine of the invention is the four station index table designated by model No. T-10-4 manufactured by the Jackson Fluid Power Co. of Jackson, Michigan. Indexing mechanism 40 includes the rotary table 120 which is mounted on top of a stationary housing 280 suspended on a framework 282 beneath platform 26 of the inspection machine. The indexing mechanism is driven by an air motor (not shown) which, via a conventional cam and index movement, intermittently drives the indexing table 120.

In addition to providing the basic movement for operating the turret and chucking structures of the ampoule inspection machine, the indexing mechanism is modified in accordance with the invention to actuate the limit switches 310 and 312 which respectively control the solenoid actuated valve mechanisms 314 and 136 which in turn respectively control the compressed air supply to the tip-up tube 100 and the ampoule holddown plunger 90 in the ampoule loading mechanism 70. Limit switch 310 (FIG. 15) is conventional and includes a leaf spring 318 which is operated by an arm 320 suitably affixed to the cam movement of indexing mechanism 40. Arm 320 is adjusted to turn on the ampoule tip-up air while the indexing movement is rotating but table 120 is stationary, switch 310 being actuated just before the movement is ready to index table 120. Suitable circuitry is also connected to limit switch 310 which simultaneously turns off the air motor drive of the index table, such circuitry comprising electronic time delay circuitry of conventional design and therefore not shown and described herein. After a suitable pause, which may be adjustable in accordance with known circuit design, the circuitry operates to turn off the tip-up air and to energize the index table air motor, causing index table 120 to rotate to the next station.

Figure 16:
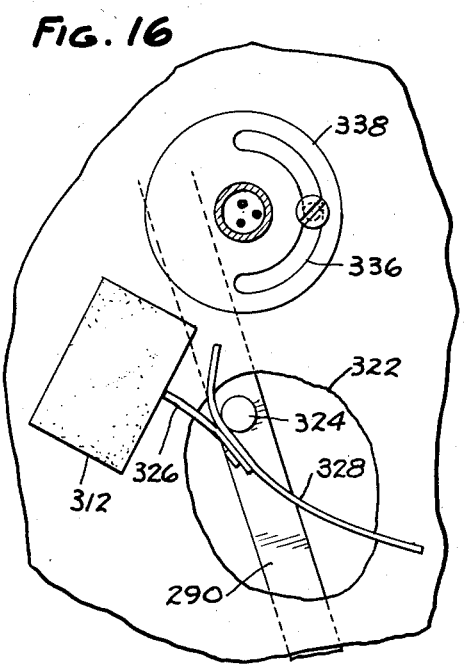
FIG. 16 is a fragmentary view of the bottom of the index drive mechanism taken on the line 16—16 of FIG. 15.
Figure 17:
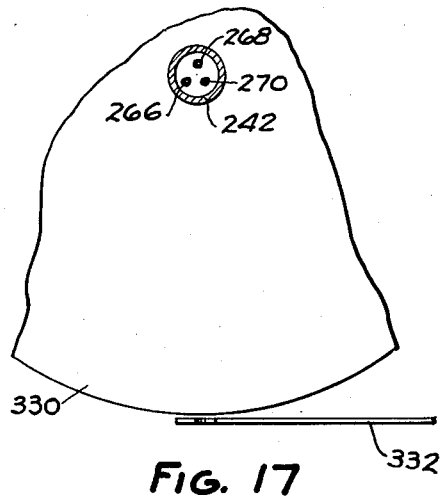
FIG. 17 is a fragmentary top view of the angular adjustment hand wheel and indicator of FIG. 15.

Limit switch 312 is also a conventional switch mechanism which is mounted beneath index mechanism 40 as shown in the bottom view of FIG. 16. A suitable opening 322 is cut in the bottom of the index mechanism to allow for movement of an actuating rod 324 which is affixed to the underside of a driving arm 290 of the index table movement so as to extend through opening 322. The operating arm 326 of limit switch 312 carries a curved metal strip 328, the switch and strip being positioned so that rod 324 engages the strip during the correct portion of its circular path of movement with driving arm 290 so as to actuate switch 312 to thereby open solenoid valve 316. The switch 312 and rod 324 are suitably adjusted so that holddown plunger 90 is actuated to extend across groove 74 of the chuck loading mechanism 70 shortly after the index table 120 has begun to move and so that plunger 90 is released shortly after the index table 120 has come to rest again.

The above index mechanism 40 is further modified in accordance with the present invention by extending the hollow slip ring shaft 242 down through the bottom of framework 282 and mounting a circular ring 330 on the bottom end of shaft 242. The periphery of ring 330 is marked off into angular graduations and a pointer arm 332 is mounted on framework 282 to assist in accurately determining the angular position of the slip ring structure mounted on the upper end of shaft 242. Circular disk 330 thus forms a hand wheel which may be readily rotated to provide the desired adjustment of the slip rings and thereby control the energization and braking of the spin motors of the turret relative to the inspection station. The angular adjustment of the shaft 242 is accomplished by loosening a cap screw 334 which extends through a semi-circular slot 336 of a collar 338 secured to shaft 242 adjacent the underside of support 282. The hollow shaft 242 also provides a conduit for slip ring leads 266, 268 and 270 through the index mechanism 40.

We claim:

1. In combination, a rotary indexable turret having chuck means thereon which revolve about the axis of rotation of the turret, said chuck means including first and second chucks one of which is operable to retract from and advance towards the other of said chucks to open and close said chucking means, means for intermittently rotating the turret to momentarily position the chuck means in the open condition thereof at a loading station located adjacent the circular path of travel of the chuck means, means for transporting containers successively in single file in the direction of one axis thereof to the loading station, chuck loading means at the loading station disposed between the open chucks when at said loading station, said chuck loading means having reorienting means aligned with the discharge end of said transport means for receiving a container therefrom and tipping the container so that said axis is disposed generally transversely of said direction of transport to position the container between the open chucks ready for clamping thereby, said chuck loading means being adapted to pass the container therefrom in the direction of chuck travel upon movement of the container with said chucks.

2. The combination set forth in claim 1 wherein said containers have a length greater than the transverse dimension thereof, said one axis comprising the longitudinal axis of the container, said re-orienting means being operative to tip the container to a position wherein the longitudinal axis of the container is generally parallel to the axis of rotation of the turret.

3. The combination set forth in claim 2 including means for rotating said chuck means on said turret about an axis parallel to the axis of rotation of said turret.

4. The combination set forth in claim 2 wherein said re-orienting means includes means for directing a stream of compressed air towards one end of the container to assist in tipping the container.

5. The combination set forth in claim 2 including a barrier adjacent the discharge end of said transport means and the path of travel of the containers therein for preventing said tipping movement of the container, and means synchronized with the indexing movement of the turret for retracting said barrier to permit said tipping movement when said chuck means is positioned at said chuck loading means.

6. The combination set forth in claim 1 wherein said re-orienting means comprises a block having a cavity therein with an outlet opening at one end thereof and an inlet opening disposed generally transversely of the axis of said outlet opening and registering with the discharge end of said transport means.

7. In combination, means for transporting containers successively in single file in the direction of one axis of the containers to an output end of said transport means, a rotatable turret including container chucking means comprising a pair of chucks one of which is movable relative to the other for receiving and clamping one of the containers therebetween, said chucks being supported for travel in a circular path about the axis of rotation of said turret, drive means for indexing said turret, said turret being operated by said drive means to momentarily locate said chucking means in open position adjacent the output end of said transport means, chuck loading means having a guiding surface positioned to slidably receive the containers in said single file orientation from said transport means, said chucking loading means having container re-orienting means for individually tipping the containers from said guiding surface to position them with said one axis thereof transverse to the direction of container travel in said transport means for reception between said chucks, said chucking means being adapted to receive the containers in said last mentioned position, said chuck loading means being adapted to pass the container therefrom in the direction of chuck travel upon movement of the container with said chucks.

8. The combination set forth in claim 7 wherein said chuck loading means comprises a loading block having a container receiving passage therein providing said guiding surface and being aligned with the output end of said transport means, said loading block also having a cavity extending transverse to said passage and opening thereto for receiving a container from said passage initially with said one axis thereof transverse to the cavity, said cavity having surfaces shaped to assist said tipping of the container as it advances from said passage into the cavity.

9. The combination set forth in claim 8 wherein said container re-orienting means includes pneumatic means including a conduit communicating with a source of compressed air, valve means for admitting compressed air to said conduit during the pause of said chucking means adjacent the output end of said transport means, said conduit having the output end thereof positioned to direct a jet of the compressed air into the cavity towards said chucking means and transverse to said passage to thereby urge the leading portion of the container towards its re-oriented position in the cavity.

10. The combination set forth in claim 8 wherein said container re-orienting means includes a reciprocable plunger extending across said passage along a line spaced from said guiding surface thereof to permit travel of the container therebetween for preventing tipping of the container in the passage and means for retracting said plunger when a chucking means is located adjacent the output end of the transport means.

11. In combination, means for transporting containers successively in single file in the direction of one axis of the containers to an output end of said transport means, a rotatable turret including container chucking means supported for travel in a circular path about the axis of rotation of said turret, said chucking means including first and second chucks with one of said chucks being operable to retract from and advance towards the other of said chucks to open and close said chucking means, drive means for indexing said turret, said turret being operated by said drive means to momentarily locate said chucking means adjacent the output end of said transport means, chuck loading means comprising a loading block having a container receiving passage therein providing a guiding surface positioned to slidably receive the containers in said single file orientation from said transport means and being aligned with the output end of said transport means, said chuck loading means having container reorienting means for individually tipping the containers from said guiding surface to position them with said one axis thereof transverse to the direction of container travel in said transport means, said loading block also having a cavity extending transverse to said passage and opening thereto for receiving a container from said passage initially with said one axis thereof transverse to the cavity, said cavity having surfaces shaped to assist said tipping of the container as it advances from said passage into the cavity, said block being open at the opposite ends of the cavity and along the side of the cavity in the direction of turret travel, said loading block being positioned and dimensioned such that said chucks travel past the opposite ends of said cavity, one of said open ends of said cavity being shaped to guide the leading end of the container onto said first chuck in the re-oriented position of the container, said side opening of said block being of sufficient size to pass the container in said reoriented position, said chucking means being adapted to receive the containers in said last mentioned position, and means for closing the chucks against the opposite ends of the re-oriented container after placement on said first chuck.

12. The combination set forth in claim 11 wherein said loading block includes a door hinged to said side thereof for closing said side opening therein, said door extending beyond said loading block into the path of travel of a leading edge of one of said chucks whereby said leading edge engages the extension of said door to open the door to thereby permit egress of the container from said cavity upon resumption of rotation of said turret.

13. The combination set forth in claim 11 wherein one of said chucks has a container engaging surface of substantially greater diameter than the corresponding end of the container, said container engaging surface flaring outwardly and towards the container such that said end of the container is caught by said flaring surface as said chucks close towards one another subsequent to resumption of turret movement and the container is cammed by said surface to the center thereof by the closing movement of the chucks.

14. The combination set forth in claim 13 wherein said central portion of said flaring surface has a recess therein, and including a resilient insert in said recess for cushioning the closing impact of the chucks on the container.

15. In a machine for inspecting the contents of liquid-filled containers, a rotatably mounted turret, a plurality of chucking mechanisms mounted at spaced intervals around said turret and each including a pair of rotatable chucks adapted to receive and rotatably support the containers individually therebetween, a plurality of electric motors mounted on said turret each having a drive shaft operably connected with one of said chucks for rotating the container received therein, brush means for each of said motors mounted on said turret for travel in a circular path therewith, conductor means connecting said brush means with corresponding motors, slip ring means positioned for sliding contact with said brush means, said slip ring means having circumferentially spaced segments insulated from one another and positioned relative to said brush means to provide circuit connections for controlling each motor in accordance with its angular position during rotation of the turret.

16. The combination set forth in claim 15 wherein said slip ring means includes a supporting shaft extending coaxially with said turret, said shaft supporting said slip ring segments concentric therewith adjacent the path of travel of said brush means, said shaft being adjustably mounted to permit angular adjustment of said slip ring segments relative to said turret to thereby provide corresponding adjustment of the operating sequence of each of said motors relative to a reference point fixed with respect to said turret.

17. The combination set forth in claim 15 including a variable frequency alternating current power supply, and wherein one of said slip ring segments is connected to said variable frequency supply to provide circuit means for energizing each of said motors at a controllable speed during the portion of travel of said respective brush means associated with each of said motors along said one slip ring segment.

18. The combination set forth in claim 17 including a source of direct current power, and wherein a second one of said slip ring segments is connected to said direct current power source to provide direct current to the field windings of each of said motors for decelerating the motor during the travel of said respective brush means associated with each of said motors along said second slip ring segment.

19. In a machine for inspecting the contents of liquid-filled containers, a cabinet having an access opening therein, a horizontally disposed platform having an opening therein, said platform being slidably mounted in said cabinet for horizontal sliding movement through said access opening, a turret including a casing extending upward through said opening in said platform and being closed near the upper end thereof, said casing being mounted for rotation relative to said platform about a vertical axis, turret drive means below said platform for rotating said casing, said turret and turret drive means being supported by said platform for horizontal movement therewith through said access opening, said casing having a peripheral flange extending radially outward therefrom above said platform, means encircling said casing and forming therewith a generally enclosed annular space therebetween below said peripheral flange, a plurality of chucking mechanisms mounted at spaced intervals on and around said turret radially intermediate said casing and said encircling means, each of said chucking mechanisms having chuck means positioned above said peripheral flange and adapted to individually receive and support the containers, chuck drive means mounted on the turret in said annular space and having an operative connection with said chuck means extending through said peripheral flange, support means mounted on said platform and including an optical housing positioned above the closed upper end of said casing such that said chucking mechanisms travel around said housing, a flexible light conductor having an input end thereof connected to a light source mounted in said cabinet independently of said platform and said turret and having an output end thereof mounted on said support means to project a beam of light into said housing, the portion of said light conductor between the ends thereof being of sufficient length to accommodate the horizontal sliding movement of said platform and optical means enclosed within said housing for focusing the light projected from the light conductor into a beam of light directed into the path of travel of the chucked containers and thence to a light sensitive inspection device.

20. The combination recited in claim 19 wherein said flexible light conductor comprises a plurality of fiber optic light pipes having the output ends thereof mounted parallel with one another in a row to thereby project parallel and overlapping beams of light into said optical means.

21. The combination set forth in claim 20 wherein said output ends of said fiber optic light pipes extend vertically downward, and wherein said optical means includes a series of first condensing lenses, one for each fiber optic light pipe, individually positioned beneath the output end of each of said fiber optic light pipes for focusing parallel beams of light therefrom, means for reflecting the light beam from said condensing lenses horizontally in a direction radially of said turret, a second condensing lens mounted in said housing to further focus the light beams reflected from said reflecting means into a single beam of parallel light rays directed into the container to be inspected.

22. The combination set forth in claim 19 wherein each of said chucking mechanisms includes a stem extending above said peripheral flange of said casing and disposed radially intermediate said optical housing and said chuck means, said stem being slotted to pass and further define the light beam transmitted from said housing to the chucked container.

23. The combination set forth in claim 22 which further includes a stripper plate supported by said platform, said stripper plate having a container engaging portion extending radially inward of the turret across the path of travel of the chucked containers for removing containers from said chucks during turret rotation, said stripper plate having a shield portion extending from said first portion to a point between the container and the slotted portion of said stem when the latter is in the light beam transmitted from said housing, said shield portion of said stripper plate having an opening therein shaped to pass and further define the light beam transmitted from said housing to the container.

24. In a machine for inspecting the contents of liquid-filled containers, a horizontally disposed platform having an opening therein, a turret including a casing extending upward through said opening in said platform and being closed near the upper end thereof, said casing being mounted for rotation relative to said platform about a vertical axis, turret drive means below said platform for rotating said casing, said casing having a peripheral flange extending radially outward therefrom above said platform, means encircling said casing and forming therewith a generally enclosed annular space therebetween below said peripheral flange, a plurality of chucking mechanisms mounted at spaced intervals on and around said turret radially intermediate said casing and said encircling means, each of said chucking mechanisms having chuck means positioned above said peripheral flange and adapted to individually receive and support the containers, chuck drive means mounted on the turret in said annular space and having an operative connection with said chuck means extending through said peripheral flange, said chuck drive means including a plurality of electric motors, each of said motors driving one of said chuck means, brush means for each of said motors spaced circumferentially around said casing and extending radially inwardly therefrom for travel in a circular path therewith, conductor means connecting said brush means with corresponding motors, and slip ring means supported by said platform below the closed upper end of said casing for sliding contact with said brush means to provide circuit connections for controlling each motor in accordance with its angular position relative to said platform during rotation of said turret.

25. In a machine for inspecting the contents of liquid-filled containers, a cabinet having a horizontally disposed platform disposed therein, a turret including a casing extending upwardly from said platform and being closed near the upper end thereof, said casing being mounted for rotation relative to said platform about a vertical axis, turret drive means below said platform for rotating said casing, said casing having a peripheral flange extending radially outward therefrom above said platform, means encircling said casing and forming therewith a generally enclosed annular space therebetween below said flange, a plurality of chucking mechanisms mounted at spaced intervals on and around said flange, each of said chucking mechanisms having chuck means positioned above said flange and adapted to individually receive and support the containers, chuck drive means mounted on the turret in said annular space and having an operative connection with said chuck means extending through said flange, container discharge means comprising a stripper plate extending across the path of travel of the containers in said chuck means and being shaped to provide a camming surface adapted to gradually direct each container radially outward of the chuck means as each chuck means travels past said plate, a downwardly inclined chute positioned to receive containers removed from said chuck means by said stripper plate, said chute leading from said casing flange over said platform to the exterior of said cabinet and a segregating gate mounted on the exterior of said cabinet at the output end of said chute and adapted to receive containers gravitating from said chute, said segregating gate comprising a housing having an inlet opening in registry with the outlet end of said chute and a pair of angularly related vanes supported in said housing for rotation between first and second positions, the first position of said vanes blocking downward passage of the containers through the housing and forming a receiving surface for catching the containers and the second position of said vanes defining a container passage extending downwardly through the housing, the movement of said vanes between said first and second positions causing a container caught by said vanes to be dropped into an outlet portion of said housing which is separate from the passage defined by said vanes in the second position thereof.

26. In combination, means for transporting containers successively in single file in the direction of one axis of the containers to an output end of said transport means, container chucking means including first and second chucks with one of said chucks being operable to retract from and advance towards the other of said chucks to open and close said chucking means, chuck loading means comprising guide means positioned to slidably receive the containers in said single file orientation from the output end of said transport means and shaped to cause tipping of the container as it advances therein to re-orient the container for loading between said chucks, said chucks being supported for travel in a path wherein said chucks are momentarily located adjacent said guide means, said guide means being positioned and dimensioned such that said chucks travel past opposite sides of said guide means in the open position of the chucks, said guide means being shaped to guide the leading end of the container onto said first chuck in the re-oriented position of the container, said guide means having an opening of sufficient size to pass the container laterally therefrom in the direction of chuck travel when the container is in said re-oriented position, and means for closing the chucks against the opposite ends of the re-oriented container after placement onto said first chuck.

27. In a machine for inspecting the contents of liquid-filled containers, a cabinet having an access opening therein, a platform mounted in said cabinet for horizontal movement through said access opening, a turret and turret drive means supported by said platform for horizontal movement therewith through said access opening, chuck means mounted on said turret and adapted to support and rotate the containers, an optical housing supported by the platform and positioned such that said chuck means travels around said housing, a flexible light conductor having an input end thereof connected to a light source mounted in said cabinet independently of said platform and having an output end thereof fixed with respect to said housing to project a beam of light thereinto, the portion of said light conductor between the ends thereof being of sufficient length to accommodate the horizontal movement of said platform, and optical means enclosed within said housing for focusing the light projected from the light conductor into a beam of light directed into the path of travel of the chucked containers and thence to a light sensitive inspection device.

28. In a machine for inspecting the contents of liquid-filled containers, a support, a turret rotatably mounted on said support, a plurality of chucks mounted at spaced intervals on and around said turret and adapted to individually receive and rotatably support the containers for movement with said turret, a plurality of electric motors supported on said turret for movement therewith, each of said motors having a driving connection with one of said chucks for rotating the container received therein, brush means for each of said motors spaced circumferentially around said turret for travel in a circular path therewith, conductor means connecting said brush means with corresponding motors, and slip ring means fixedly supported with respect to said support for sliding contact with said brush means to provide circuit connections for controlling each motor in accordance with its angular position relative to said support during rotation of said turret.

29. In a machine having means adapted to support articles for movement through a station of the machine, the combination comprising article discharge means extending across the path of travel of the articles on said support means subsequent to the station and adapted to gradually direct each article out of the support means during travel thereof past said discharge means, a downwardly inclined chute adapted to receive articles removed from said support means by said discharge means, and a segregating gate mounted at the output end of said chute adapted to receive articles gravitating from said chute, said segregating gate comprising a housing having an inlet opening in registry with the outlet end of said chute and a pair of angularly related vanes supported in said housing for rotation between first and second positions, the first position of said vanes blocking downward passage of the articles through the housing and forming a receiving surface for catching the articles and the second position of said vanes defining an article passage extending downwardly through the housing, the movement of said vanes between said first and second positions causing an article caught by said vanes to be dropped into an outlet portion of said housing which is separate from the passage defined by said vanes in the second position thereof.

References Cited in the file of this patent

UNITED STATES PATENTS

| | | |
|---|---|---|
| 1,406,193 | Kent | Feb. 14, 1922 |
| 1,658,428 | Charles | Feb. 7, 1928 |
| 1,777,361 | Gottschalk | Oct. 7, 1930 |
| 2,132,447 | Stout | Oct. 11, 1938 |
| 2,270,613 | Young | Jan. 20, 1942 |
| 2,297,154 | Kantor | Sept. 29, 1942 |
| 2,404,480 | Fernald | July 23, 1946 |
| 2,606,657 | Berthelsen | Aug. 12, 1952 |
| 2,608,456 | Barth | Aug. 26, 1952 |
| 2,752,028 | Moskowitz | June 26, 1956 |

FOREIGN PATENTS

| | | |
|---|---|---|
| 470,638 | Great Britain | Aug. 17, 1937 |